(12) United States Patent  
Chen et al.

(10) Patent No.: US 8,842,416 B2
(45) Date of Patent: Sep. 23, 2014

(54) GRAPHENE INTEGRATED ENERGY STORAGE DEVICES HAVING CAPACITIVE-LIKE PROPERTIES

(75) Inventors: Sung-wei Chen, Las Vegas, NV (US); Chris Rothfuss, Laramie, WY (US)

(73) Assignee: Empire Technology Development LLC, Wilmington, DE (US)

( * ) Notice: Subject to any disclaimer, the term of this patent is extended or adjusted under 35 U.S.C. 154(b) by 385 days.

(21) Appl. No.: 13/202,082

(22) PCT Filed: May 17, 2011

(86) PCT No.: PCT/US2011/036849
§ 371 (c)(1),
(2), (4) Date: Aug. 17, 2011

(87) PCT Pub. No.: WO2012/158162
PCT Pub. Date: Nov. 22, 2012

(65) Prior Publication Data
US 2012/0293911 A1 Nov. 22, 2012

(51) Int. Cl.
*H01G 9/00* (2006.01)
*H01G 11/32* (2013.01)
*H01G 11/04* (2013.01)
*H01G 11/02* (2013.01)

(52) U.S. Cl.
CPC ......... *H01G 11/04* (2013.01); *Y02E 60/13* (2013.01); *H01G 11/32* (2013.01); *H01G 11/02* (2013.01)
USPC ....................................... 361/502

(58) Field of Classification Search
USPC ....................................... 361/502
See application file for complete search history.

(56) References Cited

U.S. PATENT DOCUMENTS

| | | | |
|---|---|---|---|
| 5,841,627 A | 11/1998 | Prakash et al. | |
| 6,654,229 B2 | 11/2003 | Yanagisawa et al. | |
| 7,466,539 B2 * | 12/2008 | Dementiev et al. | 361/502 |
| 7,852,612 B2 | 12/2010 | Zhao | |
| 8,072,733 B2 * | 12/2011 | Hatori et al. | 361/502 |
| 2001/0021411 A1 | 9/2001 | Shah et al. | |
| 2003/0030474 A1 * | 2/2003 | McGowan | 327/202 |
| 2008/0254362 A1 * | 10/2008 | Raffaelle et al. | 429/188 |
| 2009/0185327 A1 * | 7/2009 | Seymour | 361/500 |
| 2009/0246528 A1 | 10/2009 | Istvan | |
| 2010/0035093 A1 | 2/2010 | Ruoff et al. | |

(Continued)

FOREIGN PATENT DOCUMENTS

WO 2009134707 A2 11/2009
WO 2010027336 3/2010

OTHER PUBLICATIONS

Antonio J, Lopez Martin, Tutorial Cadence Design Environment, Oct. 2002.*

(Continued)

*Primary Examiner* — David M Sinclair (57) ABSTRACT

Technologies and implementations for graphene integrated energy storage devices having capacitive-like properties are generally disclosed. Such energy storage devices may comprise capacitive-like properties and may include a first electrode including graphene, one or more electrolytes arranged in contact with the first electrode, and a second electrode arranged in contact with the one or more electrolytes. The energy storage device may further be configured to provide pseudocapacitance based at least in part on a surface layer deposition of a chemical entity accompanied by a charge transfer at the first electrode.

32 Claims, 5 Drawing Sheets

(56) References Cited

U.S. PATENT DOCUMENTS

| | | | |
|---|---|---|---|
| 2010/0177462 A1* | 7/2010 | Adzic et al. | 361/502 |
| 2010/0195263 A1 | 8/2010 | Sweeney et al. | |
| 2011/0050042 A1* | 3/2011 | Choi et al. | 310/339 |
| 2011/0183180 A1* | 7/2011 | Yu et al. | 429/128 |
| 2011/0229777 A1* | 9/2011 | Mak et al. | 429/405 |
| 2011/0242730 A1* | 10/2011 | Zhou et al. | 361/502 |
| 2011/0281174 A1* | 11/2011 | Seymour | 429/306 |
| 2012/0034550 A1* | 2/2012 | Xia et al. | 429/524 |
| 2012/0178001 A1* | 7/2012 | Zhang et al. | 429/405 |

OTHER PUBLICATIONS

Yoo, J. et al., Ultrathin Planar Graphene Supercapacitors, American Chemical Society—Nano Letters, retrieved from http://www.owlnet.rice.edu/~rv4/Ajayan/planar.pdf, published Mar. 7, 2011.

Miller, J. et al., Graphene double-layer capacitor with ac line-filtering performance, Science, Sep. 24, 2010, pp. 1637-1639, vol. 329.

Electric double-layer capacitor, retrieved from http://en.wikipedia.org/w/index.php?title=Electric_double-layer_capacitor&oldid=427611614 published May 5, 2011 (as cited in the International Search Report & Written Opinion).

Dume, D., Graphene makes supercapacitor, retrieved from the Internet http://physicsworld.com/cws/article/news/43828, published Sep. 23, 2010.

Australia Patent Office< International Search Report & Written Opinion of the International Searching Authority for PCT/US2011/036849, prepared on Jul. 25, 2011 and mailed on Jul. 26, 2011.

Kuo, S.L. and N.L. Wu, Investigation of pseudocapacitive charge-storage reaction of MnO2 nH2O supercapacitors in aqueous electrolytes, Journal of Electrochemical Society, 2006, pp. A1317-A1324, vol. 153.

Sundaram, R.S., et al., Electrochemical modification of graphene, Advanced Materials, 2008, pp. 3050-0353, vol. 20.

Vivekchand, S. R. C. et al., "Graphene-based electrochemical supercapacitors," Journal of Chemical Sciences, vol. 120, No. 1, pp. 9-13, Jan. 2008.

* cited by examiner

```
┌─────────────────────────────────────────────────────────────┐
│ Receive a First Electrode Including Graphene, a Second      │
│ Electrode, a First Electrolyte, a Second Electrolyte, a     │
│ Separator and Packaging Components                          │
│                                                         310 │
└─────────────────────────────────────────────────────────────┘
                              ↓
┌─────────────────────────────────────────────────────────────┐
│ Arrange the Electrode Including Graphene in Contact with    │
│ the First Electrolyte                                       │
│                                                         320 │
└─────────────────────────────────────────────────────────────┘
                              ↓
┌─────────────────────────────────────────────────────────────┐
│ Arrange the First and Second Electrolytes in Contact with   │
│ Opposite Sides of the Separator                             │
│                                                         330 │
└─────────────────────────────────────────────────────────────┘
                              ↓
┌─────────────────────────────────────────────────────────────┐
│ Contact the Second Electrode with the Second Electrolyte    │
│                                                         340 │
└─────────────────────────────────────────────────────────────┘
                              ↓
┌─────────────────────────────────────────────────────────────┐
│ Package the Components to form an Energy Storage Device     │
│ Having Capacitive-Like Properties                           │
│                                                         350 │
└─────────────────────────────────────────────────────────────┘
```

500 A computer program product

502 A signal bearing medium 504 at least one of one or more instructions for formatting data to instruct a process unit to receive a first electrode including graphene, a second electrode, a first electrolyte, a second electrolyte, a separator having a first side and a second side, and a packaging component;

one or more instructions for formatting data to instruct the process unit to arrange the first electrode in contact with the first electrolyte;

one or more instructions for formatting data to instruct the process unit to arrange the first electrolyte in contact with the first side of the separator;

one or more instructions for formatting data to instruct the process unit to arrange the second electrolyte in contact with the second side of the separator;

one or more instructions for formatting data to instruct the process unit to arrange the second electrode in contact with the second electrolyte; or one or more instructions for formatting data to instruct the process unit to arrange the packaging component to package the first electrode, the second electrode, the first electrolyte, the second electrolyte, and the separator to form an energy storage devices having capacitive-like properties .

| 505 a computer-readable medium | 508 a recordable medium | 510 a communications medium |

GRAPHENE INTEGRATED ENERGY STORAGE DEVICES HAVING CAPACITIVE-LIKE PROPERTIES

RELATED APPLICATION

This application is a 371 national stage entry of International Application No. PCT/US11/36849, filed on May 17, 2011 which is hereby incorporated by reference in its entirety.

BACKGROUND

Unless otherwise indicated herein, the approaches described in this section are not prior art to the claims in this application and are not admitted to be prior art by inclusion in this section.

Capacitors or energy storage devices may be used in a wide range of electronic and electrical systems. It may be desirable to provide such a device with relatively high capacitance, energy density, and power density.

SUMMARY

In accordance with some implementations, an energy storage device having capacitive-like properties may include a first electrode including graphene, one or more electrolytes arranged in contact with the first electrode, and a second electrode arranged in contact with the one or more electrolytes, wherein the energy storage device is configured to provide pseudocapacitance based at least in part on a surface layer deposition of a chemical entity accompanied by a charge transfer at the first electrode.

In accordance with some implementations, a method for forming an energy storage device having capacitive-like properties may include receiving a first electrode including graphene, a second electrode, a first electrolyte, a second electrolyte, a separator having a first side and a second side, and a packaging component, arranging the first electrode in contact with the first electrolyte, arranging the first electrolyte in contact with the first side of the separator, arranging the second electrolyte in contact with the second side of the separator, arranging the second electrode in contact with the second electrolyte, and arranging the packaging component to package the first electrode, the second electrode, the first electrolyte, the second electrolyte, and the separator to form the energy storage device, such that the energy storage device provides pseudocapacitance based on a surface layer deposition of a chemical entity in the first electrolyte accompanied by a charge transfer at the first electrode.

In accordance with some implementations, a method for providing pseudocapacitance may include contacting an electrolyte and a first electrode including graphene, contacting a second electrode and the electrolyte, and providing a surface layer deposition of a chemical entity at the first electrode, wherein the surface layer deposition is accompanied by a charge transfer at the first electrode that provides pseudocapacitance between the first electrode and the second electrode.

In accordance with some implementations, a machine readable medium may include instructions that, when executed, may cause the machine to produce an energy storage device having capacitive-like properties by receiving a first electrode including graphene, a second electrode, a first electrolyte, a second electrolyte, a separator having a first side and a second side, and a packaging component, arranging the first electrode in contact with the first electrolyte, arranging the first electrolyte in contact with the first side of the separator, arranging the second electrolyte in contact with the second side of the separator, arranging the second electrode in contact with the second electrolyte, and arranging the packaging component to package the first electrode, the second electrode, the first electrolyte, the second electrolyte, and the separator to form the energy storage device, such that the energy storage device provides pseudocapacitance based on a surface layer deposition of a chemical entity in the first electrolyte at the graphene electrode.

In accordance with some implementations, an apparatus may include a processor and a machine readable medium having stored therein instructions that, when executed, cause the apparatus to produce ann energy storage device having capacitive-like properties by receiving a first electrode including graphene, a second electrode, a first electrolyte, a second electrolyte, a separator having a first side and a second side, and a packaging component, arranging the first electrode in contact with the first electrolyte, arranging the first electrolyte in contact with the first side of the separator, arranging the second electrolyte in contact with the second side of the separator, arranging the second electrode in contact with the second electrolyte, and arranging the packaging component to package the first electrode, the second electrode, the first electrolyte, the second electrolyte, and the separator to form the energy storage device, such that the energy storage device provides pseudocapacitance based on a surface layer deposition of a chemical entity in the first electrolyte accompanied by a charge transfer at the first electrode.

In accordance with some implementations, a machine readable medium may include instructions that, when executed, may cause the machine to provide pseudocapacitance by contacting an electrolyte and a first electrode including graphene, contacting a second electrode and the electrolyte, and providing a surface layer deposition of a chemical entity at the first electrode, wherein the surface layer deposition is accompanied by a charge transfer at the first electrode that provides pseudocapacitance between the first electrode and the second electrode.

In accordance with some implementations, an apparatus may include a processor and a machine readable medium having stored therein instructions that, when executed, cause the apparatus to provide pseudocapacitance by contacting an electrolyte and a first electrode including graphene, contacting a second electrode and the electrolyte, and providing a surface layer deposition of a chemical entity at the graphene electrode, wherein the surface layer deposition is accompanied by a charge transfer at the first electrode that provides pseudocapacitance between the first electrode and the second electrode.

The foregoing summary may be illustrative only and may not be intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatuses, systems and computer readable media related to graphene integrated energy storage devices having capacitive-like properties.

In some examples, a surface layer deposition of a chemical entity at a graphene electrode or an electrode including graphene may be accompanied by a charge transfer which may produce pseudocapacitance. The pseudocapacitance may be used in, for example, a capacitor structure to provide an energy storage device having capacitive-like properties. An energy storage device utilizing pseudocapacitance based on a surface layer deposition of a chemical entity and the related charge transfer may provide increased capacitance, energy storage and power storage over current capacitors or energy storage devices.

Figure 1:
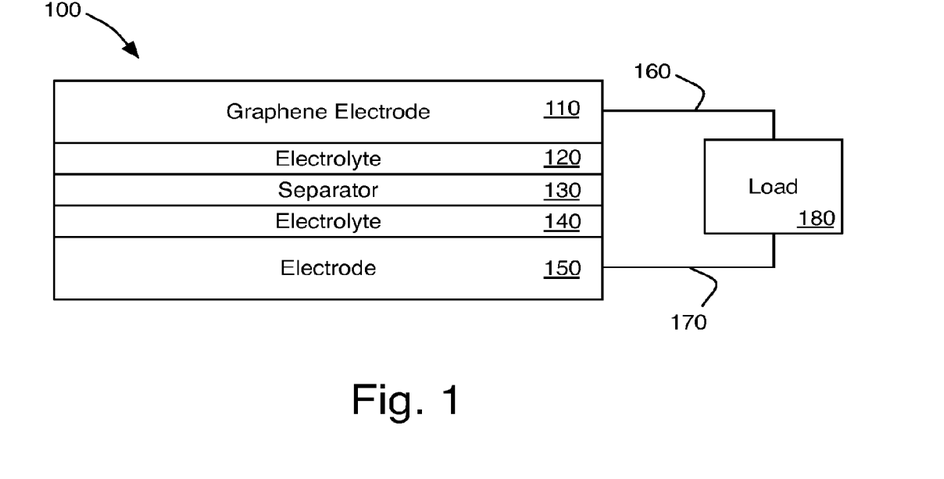
FIG. 1 is an illustration of an example energy storage device having capacitive-like properties.

FIG. 1 is an illustration of an example energy storage device having capacitive-like properties, arranged in accordance with at least some embodiments of the present disclosure. As shown in FIG. 1, a device 100 may include a graphene electrode 110, an electrolyte 120, a separator 130, an electrolyte 140 and an electrode 150. Device 100 may also include, or may be coupled to, a conductor 160 and a conductor 170. Conductors 160, 170 may be coupled to a load 180. In general, a surface layer deposition of a chemical entity from electrolyte 120 onto graphene electrode 110 may be accompanied by a charge transfer that may result in pseudocapacitance for device 100.

In general, the surface layer deposition at graphene electrode 110 may include any reversible electrochemical reaction of a chemical entity suitable for providing a charge transfer at graphene electrode 110. In some examples, the surface layer deposition may be a Faradaic-like surface layer deposition. In some examples, the surface layer deposition may be a redox like surface layer deposition at graphene electrode 110. In some examples, the surface layer deposition may include a self-delimited electrochemical reaction. In some examples, the surface layer deposition may be an electrodeposition. In some examples, the surface layer deposition may provide monolayer or fractional monolayer coverage at graphene electrode 110.

In general, any chemical entity suitable for providing a charge transfer at graphene electrode 110 may be used as the chemical entity in surface layer deposition. In some examples, the chemical entity may include a noble metal (i.e., ruthenium, rhodium, palladium, silver, osmium, iridium, platinum, and gold). In some examples, a single chemical entity may be used. In other examples, two or more chemical entities may be used. In some examples, the deposited chemical entity may be palladium. In some examples, electrolyte 120 may include any electrolyte including a noble metal. In general, electrolyte 120 may include acidic, basic, aprotic, or organic electrolytes. In some examples, electrolyte 120 may include a solution of sodium tetrachloropalladate(II) ($Na_2PdCl_4$) in ethanol, and the surface layer deposition may include electroplating of palladium. In some examples, electrolyte 120 may also include lithium perchlorate ($LiClO_4$). In some examples, the solution may include 0.1 mM sodium tetrachloropalladate(II) ($Na_2PdCl_4$) and 0.1 mM lithium perchlorate ($LiClO_4$) in ethanol.

As shown in FIG. 1, in some examples, a separator may be positioned effective to separate electrolyte 120 and electrolyte 140. In general, separator 130 may include any suitable material or materials. In some examples, separator 130 may be a porous separator material. In some examples, separator 130 may be a paper material. In some examples, separator 130 may be an ion permeable polymer membrane material. In general, electrode 150 may include any suitable conductive material or materials such as, for example, metal materials. In an example, electrode 150 may include platinum.

In other examples, a separator may not be used. In such examples, the energy storage device may include graphene electrode 110 and electrode 150 arranged in contact with an electrolyte. Any of the graphene materials, electrode materials, and electrolytes discussed herein may be used in such an energy storage device.

As shown in FIG. 1, in some examples, device 110 may include two electrodes. In other examples, the device may include a multiple electrode configuration. In some examples, the device may include a three electrode configuration.

In general, device 100 may be considered an energy storage having capacitive-like properties. In some examples, device 100 may be considered a capacitive-like electrical device. In some examples, device 100 may be considered an energy storage device based on capacitive and capacitive-like mechanism(s). In some examples, device 100 may be considered an ultracapacitor. In some examples, device 100 may be considered a pseudocapacitor. In some examples, device 100 may be considered a monolayer deposition-based pseudocapacitor.

In general, device 100 may be implemented or used in any suitable circuitry or electronic system. In some examples, device 100 may be implemented as a discrete device that is coupled to conductors 160, 170. In such examples, conductors 160, 170 may be wires or traces on a printed circuit board, for example. In some examples, device 100 may be implemented as an integrated device. In such examples, conductors 160, 170 may include traces on an integrated circuit, for example. Device 100 may also include a packaging component (not shown) which may contain some or all of the illustrated components. In some examples, the packaging component may be a casing for the enclosed components. Load 180 may be any suitable circuitry that may use or implement device 100. In various examples, load 180 may include energy storage circuitry, pulsed power circuitry, power supply circuitry, signaling circuitry, noise cancellation or filtering circuitry, sensing circuitry, or the like.

As shown, device 100 may include electrolytes 120, 140. In general, electrolytes 120, 140 may include any suitable materials for electrochemistry that may be used to induce a surface layer deposition at graphene electrode 110. In some examples, electrolytes 120, 140 may be substantially the same materials. In such examples, separator 130 may not be required. In other examples, electrolytes 120, 140 may include substantially different materials. In some examples, electrolyte 120 and electrolyte 140 may be substantially the same materials and each may be a solution of sodium tetrachloropalladate(II) ($Na_2PdCl_4$) and lithium perchlorate ($LiClO_4$) in ethanol. In some examples, one or both of electrolytes 120, 140 may be implemented in a solution. In other examples, one or both of electrolytes 120, 140 may be implemented in a gel, a chemical matrix, or the like.

As shown, device 100 may include graphene electrode 110. In general, graphene electrode 110 may include a pure graphene material or any graphene-like material. The term graphene electrode as discussed herein is meant to be inclusive of both pure graphene and graphene-like materials, which may include graphene in a variety of configurations, for example. In some examples, graphene electrode 110 may include a graphene-like material such as a graphene paper, a graphene sheet, a packed graphene, an aggregate of extended graphene, a modified graphene or the like. Graphene and graphene-like materials may provide the advantage of high surface area for surface layer deposition, and they may provide intrinsic pseudocapacitance with the deposition of a variety of chemical entities. Device 100 may also include current collectors (not shown for the sake of clarity), which may be in electrical contact with graphene electrode 110 and electrode 150.

Figure 2:
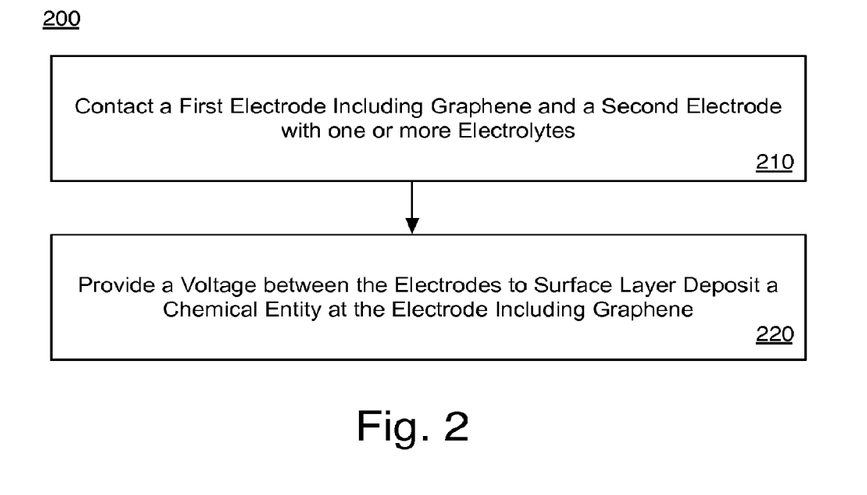
FIG. 2 is an illustration of a flow chart of an example method for providing pseudocapacitance.

FIG. 2 is an illustration of a flow chart of an example method 200 for providing pseudocapacitance, arranged in accordance with at least some embodiments of the present disclosure. Method 200 may include one or more functions, operations or actions as illustrated by one or more of blocks 210 and/or 220. In some examples, method 200 may be implemented at a device or system such as, for example, an electrical device or system. In some examples, method 200 may be implemented under the control of a device or system such as, for example, a computing system. The process of method 200 may begin at block 210.

At block 210, "Contact a First Electrode Including Graphene and a Second Electrode with one or more Electrolytes", a first electrode including graphene and a second electrode may be brought into physical and electrochemical contact with an electrolyte. In some examples, the electrodes may be brought into physical and electrochemical contact with the same electrolyte. In other examples, they may each be brought into contact with different electrolytes. In such examples, the electrolytes may be separated by a separator. The first electrode and/or the second electrode may be brought into physical and electrochemical contact with the electrolyte or electrolytes using any suitable device or devices. In some examples, they may be brought into contact by an assembly device, such as, for example, a robotic arm or arms, an assembly chuck, an assembly line used in conjunction with a pick and place device, or the like. In some examples, the may be brought into contact using the system discussed herein with respect to FIG. 4. In some examples, they may be brought into contact to form an energy storage device having capacitive-like properties such as, the device described with respect to FIG. 1. Any of the materials discussed herein may be used for the graphene electrode and the electrolyte. In some examples, the electrolyte may include sodium tetrachloropalladate(II) ($Na_2PdCl_4$) and lithium perchlorate ($LiClO_4$) in ethanol. In general, the electrolyte may be chosen such that, under a voltage bias, a surface layer deposition of a chemical entity may occur at the graphene electrode. The surface layer deposition may be accompanied by a charge transfer which may provide pseudocapacitance. The process of method 200 may continue at block 220.

At block 220, "Provide a Voltage between the Electrodes to Surface Layer Deposit a Chemical Entity at the Electrode Including Graphene", a voltage may be applied between the electrodes such that a surface layer deposition of the chemical entity at the graphene electrode may provide pseudocapacitance between the electrodes. The voltage may be applied by any suitable device or devices. In some examples, the voltage may be applied between the electrodes by a load such as the load described with respect to FIG. 1. In some examples, applied voltage may be in the range of about −0.5 V to about −1.00 V. In some examples, applied voltage may be in the range of about −0.4 V to about −0.8 V. In some examples, applied voltage may be in the range of about −0.8 V to about −1.20 V. As discussed, the pseudocapacitance may be provided based on the surface layer deposition of the chemical entity at the graphene electrode. The deposition may be accompanied by a charge transfer that may produce a pseudocapacitance.

Figure 3:
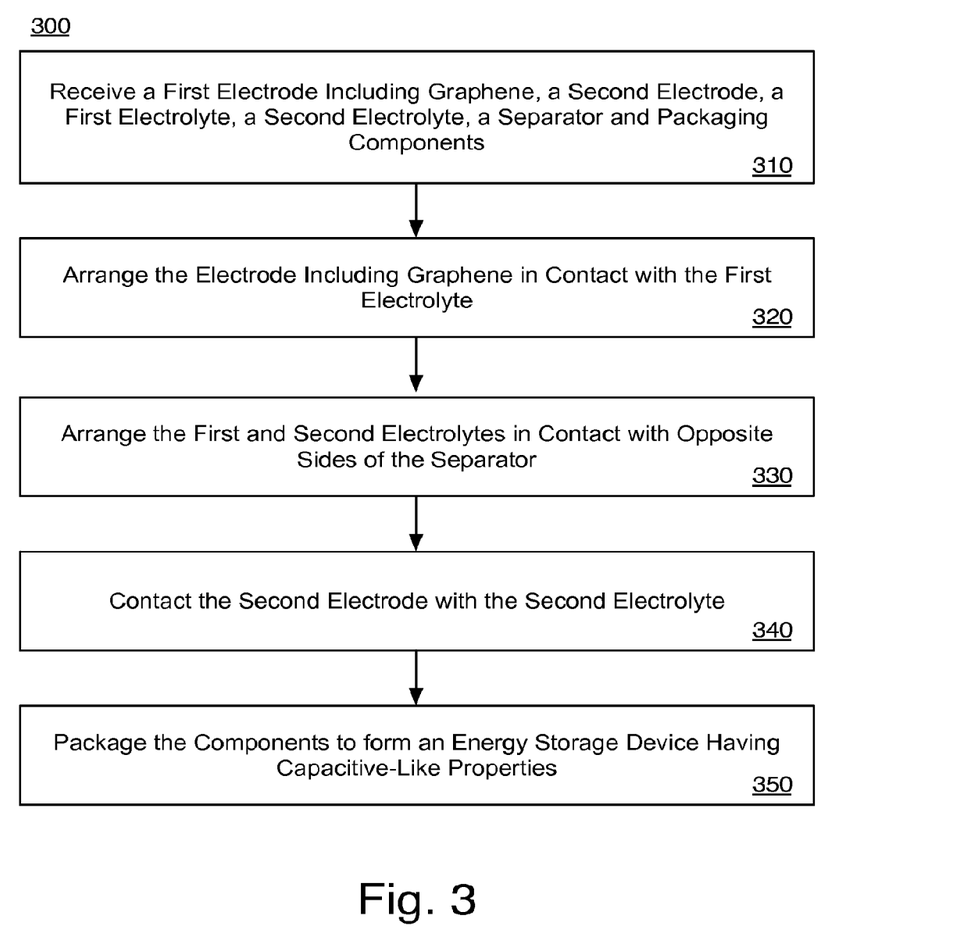
FIG. 3 is an illustration of a flow chart of an example method for making an energy storage device having capacitive-like properties.

FIG. 3 is an illustration of a flow chart of an example method 300 for forming an energy storage device having capacitive-like properties, arranged in accordance with at least some embodiments of the present disclosure. Method 300 may include one or more functions, operations or actions as illustrated by one or more of blocks 310, 320, 330, 340, and/or 350. In some examples, method 300 may be implemented under the control of a device or system such as, for example, the system discussed with respect to FIG. 4 below. The process of method 300 may begin at block 310.

At block 310, "Receive a First Electrode Including Graphene, a Second Electrode, a First Electrolyte, a Second Electrolyte, a Separator and Packaging Components", the listed components may be received. Any of the components or materials discussed herein may be received at block 310. The components or materials may be received at, for example, a receiving unit. The receiving unit may receive the components along an assembly line or via an automated material handling system, or the like, and it may include any suitable devices or components such as those discussed herein with respect to FIG. 4. The process of method 300 may continue at block 320.

At block 320, "Arrange the Electrode Including Graphene in Contact with the First Electrolyte", the received graphene electrode may be arranged in contact with the received first electrolyte. The graphene electrode and the first electrolyte may be arranged in position by any suitable tooling or devices. In some examples, the first electrolyte may be held in place, in a container or packaging component, for example, and the graphene electrode may be placed into contact with the first electrolyte by a pick and place robot, an actuated placement tool, a vacuum actuated assembly chuck, or the like. In some examples, the graphene electrode may be arranged in contact with the first electrolyte by assembly components in a device assembly unit as is discussed further herein with respect to FIG. 4. The process of method 300 may continue at block 330.

At block 330, "Arrange the First and Second Electrolytes in Contact with Opposite Sides of the Separator", the electrolytes may be arranged adjacent to and in contact with the separator. In general, any of the separator materials and electrolytes discussed herein may be used. The electrolytes may be arranged in contact with the separator using any suitable tooling or devices. In some examples, the first electrolyte may be held in place, in a container or a packaging component, for example, and the separator may be positioned in contact with the electrolyte by a pick and place robot or an actuated placement tool, or the like. The separator and first electrolyte may then be repositioned, by tipping them over, for example, and the second electrolyte may then be positioned in contact with the separator using similar tools or equipment. In some examples, the first and second electrolytes may be arranged in contact with the separator by assembly components in a device assembly unit as is discussed further herein with respect to FIG. 4. As discussed, in some examples, devices may not require a separator. For the assembly of such devices, the process discussed with respect to block 330 may be removed. The process of method 300 may continue at block 340.

At block 340, "Contact the Second Electrode with the Second Electrolyte", the second electrode may be arranged in contact with the second electrolyte. The second electrode and the second electrolyte may be arranged in position by any suitable tooling or devices. In some examples, the second electrolyte, along with the other assembled components may be held in place and the second electrode may be placed into contact with the second electrolyte by a pick and place robot, an actuated placement tool, a vacuum actuated assembly chuck, or the like. In some examples, the second electrode may be arranged in contact with the second electrolyte by assembly components in a device assembly unit as is discussed further herein with respect to FIG. 4. The process of method 300 may continue at block 350.

At block 350, "Package the Components to form an Energy Storage Device Having Capacitive-Like Properties", the assembled components may be packaged using the packaging components received at block 310. The packaging components may include a casing, a device package, or the like. The assembled components may be arranged in position by any suitable tooling or devices. In some examples, the packaging components or components may be held in place, on a vacuum chuck or an assembly table, for example, and the assembly components may be placed on the packaging components by a pick and place robot, an actuated placement tool, a vacuum actuated assembly chuck, or the like. In some examples, the components may be packaged by components in a device packaging unit as is discussed further herein with respect to FIG. 4.

As discussed with respect to method 300, the first electrode including graphene may be arranged in contact with the first electrolyte, the first and second electrolytes may be arranged in contact with opposite sides of a separator, and a second electrode may be arranged in contact with the second electrolyte. In some examples, those actions may be performed in the order listed. In general, the listed actions may be performed in any suitable order. For example, the electrolytes may be arranged in contact with the separator and then the electrodes may be contacted with the electrolytes. In other examples, the second electrode and second electrolyte may be arranged adjacent to one side of the separator and the first electrolyte and the graphene electrode may be subsequently arranged adjacent to the opposite side of the separator.

Figure 4:
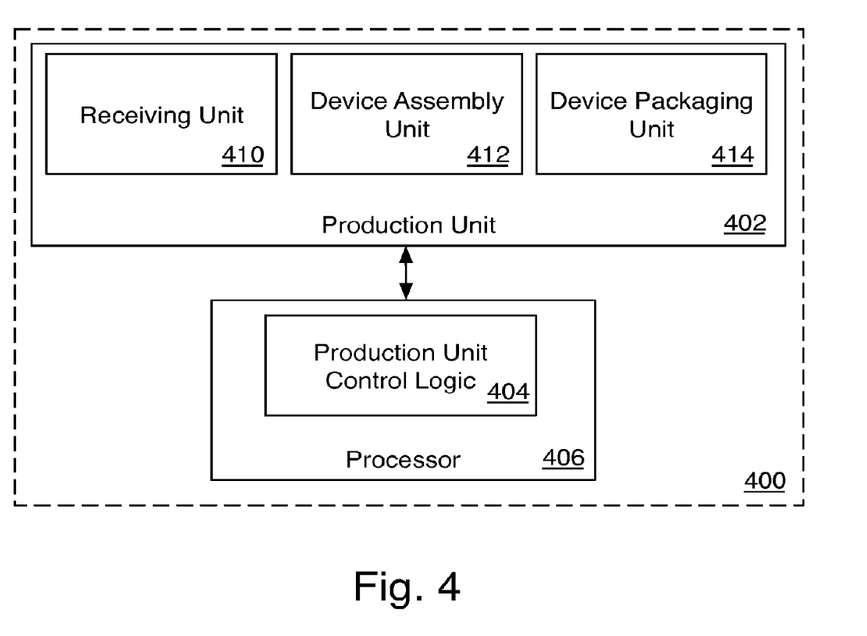
FIG. 4 is an illustration of an example system for making an energy storage device having capacitive-like properties.

FIG. 4 illustrates an example system 400 for producing energy storage devices having capacitive-like properties, arranged in accordance with at least some embodiments of the present disclosure. System 400 may be used to perform some or all of the functions discussed above with respect to FIG. 3, for example. System 400 may include a production unit 402 operably coupled to a processor 406 that may include production unit control logic 404. As shown, production unit 402 may include a receiving unit 410, a device assembly unit 412, and a device packaging unit 414. In general, production unit 412 may include any arrangement of production and assembly tools and/or systems, such as one or more tools, that may be utilized to undertake the assembly of the devices as discussed herein.

In some examples, production unit 402 may include a robotic arm, an assembly chuck having a vacuum securement port or ports, component bins, vessels for the provision of electrolytes, various tubing and piping, or the like. Some or all of those components may be housed in the production unit or they may be configured such that some or all of them may be added to and removed from the production unit. The production unit may also include electro-mechanical devices that may be utilized to actuate the various components. In some examples, the electro-mechanical devices may be operable under applied signals, such as, for example, communication signals. In some examples, receiving unit 410 may include components for receiving the materials discussed herein, such as a receiving part of an assembly line, a receiving part of an automated handling system or the like. In some examples, device assembly unit 412 may include tools and equipment for assembling devices such as, for example, a holder or holders, a pick and place robot, an actuated placement tool, a vacuum actuated assembly chuck, or the like. In some examples, device packaging unit 414 may include tools and equipment for packaging energy storage devices having capacitive-like properties such as, for example, a vacuum chuck, an assembly table, a pick and place robot, an actuated placement tool, a vacuum actuated assembly chuck, or the like. In some examples, receiving unit 410, device assembly unit 412 and/or device packaging unit 414 may share tooling or equipment.

Production unit control logic 404 may be configured to provide functional control of some or all of the production and assembly equipment in production unit 402 and may include hardware, software or firmware logic and/or any combination thereof although claimed subject matter is not limited to specific types or manifestations of processing unit control logic. Processor 406 may be a microprocessor or Central Processing Unit (CPU). In other implementations, processor 406 may be an Application Specific Integrated Circuit (ASIC), a Field Programmable Gate Array (FPGA), a digital signal processor (DSP), or other integrated formats. Processor 406 and production unit 402 may be configured to communicate by any suitable means, such as, for example, by wired connections or wireless connections. In some examples, processor 406 and/or processing unit control logic 404 may be implemented as part of a computer system as discussed with respect to FIG. 6. In some examples, processor 406 and/or processing unit control logic 404 may be configured to implement instructions such as, for example, those discussed with respect to FIG. 5.

Figure 5:
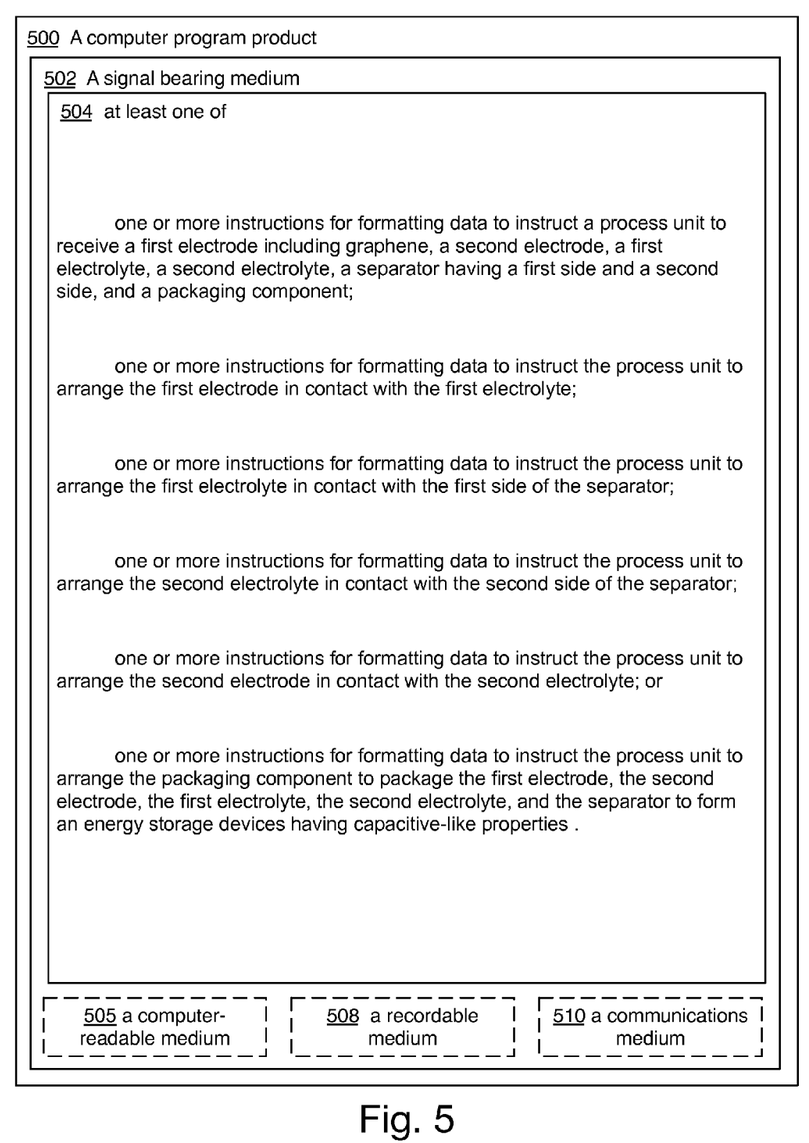
FIG. 5 is an illustration of an example computer program product.

FIG. 5 illustrates an example computer program product 500, arranged in accordance with at least some embodiments of the present disclosure. Computer program product 500 may include machine readable non-transitory medium having stored therein a plurality of instructions that, when executed, cause the machine to produce an energy storage device having capacitive-like properties or provide pseudocapacitance according to the processes and methods discussed herein. Computer program product 500 may include a signal bearing medium 502. Signal bearing medium 502 may include one or more machine-readable instructions 504, which, when executed by one or more processors, may operatively enable a computing device to provide the functionality described herein. In various examples, some or all of the machine-readable instructions may be used by the devices discussed herein.

In some implementations, signal bearing medium 502 may encompass a computer-readable medium 505, such as, but not limited to, a hard disk drive, a Compact Disc (CD), a Digital Versatile Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communication link, a wireless communication link, etc.). In some examples, signal bearing medium 502 may encompass a machine readable non-transitory medium.

Figure 6:
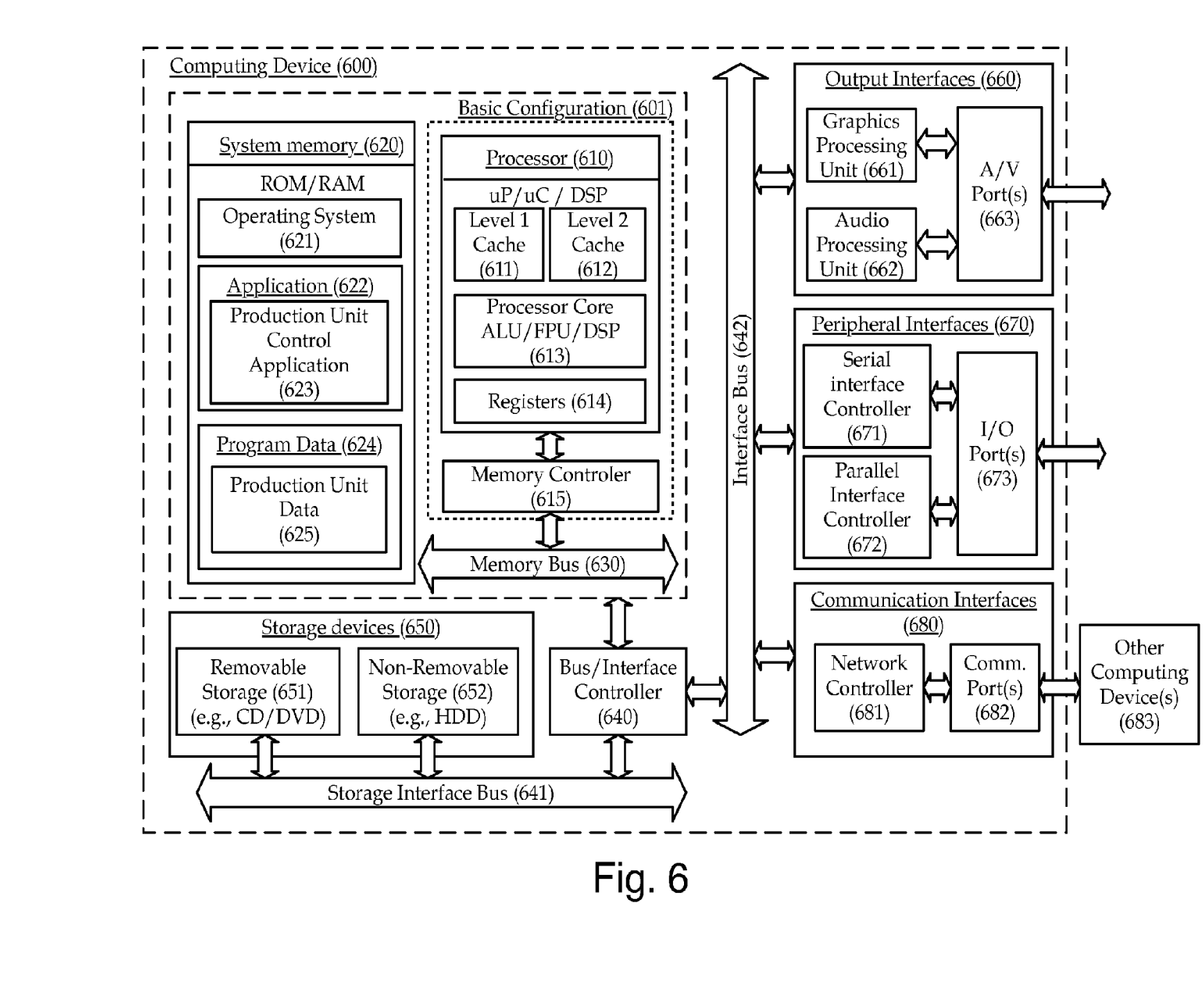
FIG. 6 is an illustration of a block diagram of an example computing device, all arranged in accordance with at least some embodiments of the present disclosure.

FIG. 6 is a block diagram illustrating an example computing device 600, arranged in accordance with at least some embodiments of the present disclosure. In various examples, computing device 600 may be configured to provide the operations discussed herein. In various examples, computing device 600 may be configured to provide or control process steps discussed herein. In an example, the devices discussed with respect to FIG. 5 may be provided as a part of computing device 600. In one example basic configuration 601, computing device 600 may include one or more processors 610 and system memory 620. A memory bus 630 can be used for communicating between the processor 610 and the system memory 620.

Depending on the desired configuration, processor 610 may be of any type including but not limited to a microprocessor (µP), a microcontroller (µC), a digital signal processor (DSP), or any combination thereof. Processor 610 can include one or more levels of caching, such as a level one cache 611 and a level two cache 612, a processor core 613, and registers 614. The processor core 613 can include an arithmetic logic unit (ALU), a floating point unit (FPU), a digital signal processing core (DSP Core), or any combination thereof. A memory controller 615 can also be used with the processor 610, or in some implementations the memory controller 615 can be an internal part of the processor 610.

Depending on the desired configuration, the system memory 620 may be of any type including but not limited to volatile memory (such as RAM), non-volatile memory (such as ROM, flash memory, etc.) or any combination thereof. System memory 620 may include an operating system 621, one or more applications 622, and program data 624. Application 622 may include production unit control application 623 that can be arranged to perform the functions, actions, and/or operations as described herein including the functional blocks, actions, and/or operations described herein. Program Data 624 may include production unit data 625 for use with production unit control application 623. In some example embodiments, application 622 may be arranged to operate with program data 624 on an operating system 621. This described basic configuration is illustrated in FIG. 6 by those components within dashed line 601.

Computing device 600 may have additional features or functionality, and additional interfaces to facilitate communications between the basic configuration 601 and any required devices and interfaces. For example, a bus/interface controller 640 may be used to facilitate communications between the basic configuration 601 and one or more data storage devices 650 via a storage interface bus 641. The data storage devices 650 may be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 620, removable storage 651 and non-removable storage 652 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of device 600.

Computing device 600 may also include an interface bus 642 for facilitating communication from various interface devices (e.g., output interfaces, peripheral interfaces, and communication interfaces) to the basic configuration 601 via the bus/interface controller 640. Example output interfaces 660 may include a graphics processing unit 661 and an audio processing unit 662, which may be configured to communicate to various external devices such as a display or speakers via one or more A/V ports 663. Example peripheral interfaces 670 may include a serial interface controller 671 or a parallel interface controller 672, which may be configured to communicate with external devices such as input devices (e.g., keyboard, mouse, pen, voice input device, touch input device, etc.) or other peripheral devices (e.g., printer, scanner, etc.) via one or more I/O ports 673. An example communication interface 680 includes a network controller 681, which may be arranged to facilitate communications with one or more other computing devices 683 over a network communication via one or more communication ports 682. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 600 may also be implemented as a personal computer including both laptop computer and non-laptop computer configurations. In addition, computing device 600 may be implemented as part of a wireless base station or other wireless system or device.

As discussed, energy storage devices having capacitive-like properties described herein may provide relatively high capacitance, energy storage and power storage. In some examples, the pseudocapacitance may be provided by the deposition of a chemical entity at a graphene electrode. In an example, the deposition may include an electrodeposition of palladium from a sodium tetrachloropalladate(II) ($Na_2PdCl_4$) solution. Using that example for illustrative purposes, the capacitance per surface area of electrodeposited material may be determined as follows.

A surface deposition of palladium on graphene may be accompanied by a charge transfer that results in pseudocapacitance. In analogy to a Langmuir isotherm, the capacitance may vary linearly and proportionally to the derivative of the surface coverage with respect to applied electrode voltage. The linear factor may be the total charge passed. The following relationships may be defined (Equations 1 to 5):

$$\frac{\theta}{1-\theta} = Ke^{-VF/RT} \tag{1}$$

$$\theta = \frac{1}{\frac{1}{Ke^{-VF/RT}} + 1} \tag{2}$$

$$\frac{d\theta}{dV} = \frac{F}{KRTe^{-VF/RT}} \frac{1}{\left(\frac{1}{Ke^{-VFRT}} + 1\right)} \tag{3}$$

$$C = q_1 \frac{d\theta}{dV} \tag{4}$$

$$C = q_1 \frac{F}{KRTe^{-VF/RT}} \frac{1}{\left(\frac{1}{Ke^{-VFRT}} + 1\right)} \tag{5}$$

where $\theta$ may be a monolayer coverage ratio (ranging from 0 to 1), K may be a Langmuir-like equilibrium constant for the monolayer deposition, V may be a voltage versus a reference voltage, F may be Faraday's constant (96485.3399 C/mol), R may be the gas constant (8.314472 J/K·mol), T may be temperature (assumed to be bout 300 K), $q_1$ may be the total charge passed at $\theta$=1 per $cm^2$ (full monolayer coverage), and C may be capacitance per $cm^2$.

The final relationship for capacitance (Equation 5), may be substantially simplified when the product of the Boltzmann constant and the exponential factor may be smaller than unity (which may be valid at room temperature (about 300K) and at operating temperatures of an energy storage devices having capacitive-like properties), which may give the following:

$$C = q_1 \frac{KF}{RT} e^{-VF/RT} \tag{6}$$

As discussed, in the example, palladium may be electrodeposited in a reversible plating electrochemical reaction from a sodium tetrachloropalladate(II) ($Na_2PdCl_4$). In such an example, the reduction of the palladium may consume two electrons per palladium atom, and the number of palladium atoms deposited per carbon atom at the graphene electrode may be approximated at a ratio of 1 palladium atom to 6 carbon atoms (1 Pd:6 C), which may be equivalent to 1 palladium atom per a hexagonal graphene unit of 6 carbon atoms. Further, the unit surface area per carbon atom may be approximated as $3.32 \times 10^{15}$ carbon atoms/$cm^2$. Therefore, for the given example, the total charge passed at full monolayer coverage, $q_1$, may be given as:

$$q_1 = (3.32 \times 10^{15} \ C \ \text{atoms/cm}^2) \tag{7}$$
$$\left(\frac{1/6 \ Pd \ \text{atoms}}{1 \ C \ \text{atom}}\right)(2 \ e^-)(1.6022 \times 10^{-19} \ C/e^-)$$

$$q_1 = 177 \ \mu C/cm^2 \tag{8}$$

The Langmuir-like equilibrium constant, K, may be determined by experimentally varying a reaction variable, such as electrode potential (V), and observing fractional coverage ($\theta$), or the equilibrium constant may be estimated by regression. In an example, a simple linear approximation between two points may be used, as follows:

$$K = \frac{\frac{\theta_2}{1-\theta_2} - \frac{\theta_1}{1-\theta_1}}{e^{V_2 F/RT} - e^{V_1 F/RT}} \tag{9}$$

For the palladium electrodeposition used for example purposes, fractional coverage at two known potentials may be used. The coverage at a potential of –0.85V may be 0.4 and the coverage at a potential of –0.70V may be 0.35. Applying the given values in equation 9 may provide a The Langmuir-like equilibrium constant, K, of:

$$K = 6.76 \times 10^{-16} \tag{10}$$

Based on the above, the given values may be applied in equation 6 to provide a capacitance per $cm^2$, C, of:

$$C = 882 \ \mu F/cm^2 \tag{11}$$

Such a capacitance potential may provide high capacitance, energy storage and power storage for the energy storage devices having capacitive-like properties discussed herein. Further, specific volumetric capacitance may be determined as follows. Assuming a packing dimension of $0.670 \times 10^{-5}$ cm, which may be about 200 times larger than the normal layer-to-layer stacking of graphene, specific volumetric capacitance may be determined as follows:

$$C_v = C \cdot 1/0.670 \times 10^{-5} \ cm = 132 \ F/cm^3 \tag{12}$$

where $C_v$ may be the capacitance per $cm^3$.

In some examples, an energy storage device capacity of about 5,000 F may be a limit of currently available capacitors. Such capacitors may be very large. The approximate dimensions of a capacitor built using the techniques described herein based on the example discussed may a cube of about 3.36 cm on each side, as shown by equation 13 below:

$$\left(\frac{5000\ F}{132\ F/cm^3}\right)^{1/3} = 3.36\ cm \quad (13)$$

A cubic energy storage device having 3.36 cm on each side may be substantially smaller than currently available capacitors.

Continuing with the illustrative example, the energy density per unit volume, $E_v$, and specific energy density per unit mass, $E_s$, may be determined as follows. The energy density per unit volume may be given by:

$$E_v = \frac{CV^2}{2} = \frac{132\ F/cm^3 \cdot (1\ V)^2}{2 \cdot 3600\ s/hr} = 1.83 \times 10^{-2}\ Wh/cm^3 \quad (14)$$

where C may have been determined in equation 12 above and V may be assumed to be about 1 V.

The specific energy density per unit mass may be given by:

$$E_s = \frac{E_v}{\rho} \quad (15)$$

where $\rho$ may be the mass density of the graphene and palladium (C and Pd). The mass density of the graphene and palladium may be approximated as about $3.94 \times 10^{-6}\ kg/cm^3$. Using the energy density per unit volume determined at equation 14, the specific energy density per unit mass may be determined as:

$$E_s = \frac{E_v}{\rho} = \frac{1.83 \times 10^{-2}\ Wh/cm^3}{3.94 \times 10^{-6}\ kg/cm^3} = 4.70 \times 10^2\ Wh/kg \quad (15)$$

An energy storage device having capacitive-like properties having an energy density per unit volume in the range of about $1.83 \times 10^{-2}$ Wh/cm³ and a specific energy density per unit mass in the range of about $4.70 \times 10^2$ Wh/kg may provide substantially larger energy density than currently available capacitors.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communication link, a wireless communication link, etc.).

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. An energy storage device having capacitive-like properties comprising:
    a first electrode comprising a first material, the first electrode including graphene;
    one or more electrolytes arranged in contact with the first electrode and/or a second electrode; and
    the second electrode comprising a second material, the second electrode arranged in contact with the one or more electrolytes, wherein the energy storage device is configured to provide pseudocapacitance based at least in part on a surface layer deposition of a chemical entity accompanied by a charge transfer at the first electrode, wherein the first material is different from the second material; and
    a separator having a first side and a second side, wherein a first electrolyte of the one or more electrolytes is arranged in contact with the first side of the separator and a second electrolyte of the one or more electrolytes is arranged in contact with the second side of the separator, wherein the first electrolyte is arranged in contact with the first electrode and the second electrolyte is arranged in contact with the second electrode, and wherein the first electrolyte comprises a first solution comprising first species and the second electrolyte comprises a second solution comprising second species, wherein the first solution and the second solution are substantially separate and wherein the first species is different from the second species.

2. The energy storage device of claim 1, wherein the surface layer deposition comprises an electrodeposition.

3. The energy storage device of claim 2, wherein the electrodeposition produces at least one of monolayer coverage or fractional monolayer coverage of the chemical entity.

4. The energy storage device of claim 2, wherein the chemical entity comprises a noble metal.

5. The energy storage device of claim 4, wherein the noble metal comprises palladium.

6. The energy storage device of claim 1, wherein the second material comprises platinum.

7. The energy storage device of claim 6, wherein the one or more electrolytes comprises one electrolyte of a solution of sodium tetrachloropalladate(II) ($Na_2PdCl_4$) in ethanol.

8. The energy storage device of claim 7, wherein the solution further comprises lithium perchlorate ($LiClO_4$).

9. The energy storage device of claim 1, wherein the separator comprises at least one of a paper material or an ion permeable polymer membrane material.

10. The energy storage device of claim 1, wherein the graphene comprises at least one of a graphene paper, a graphene sheet, a packed graphene, an aggregate of extended graphene, a modified graphene, or a pure graphene.

11. The energy storage device of claim 1, wherein the energy storage device comprises an ultracapacitor.

12. A method for forming an energy storage device having capacitive-like properties comprising:
    receiving a first electrode including graphene, a second electrode that is different from the first electrode, a first electrolyte, a second electrolyte, a separator having a first side and a second side, and a packaging component;
    arranging the first electrode in contact with the first electrolyte;

arranging the first electrolyte in contact with the first side of the separator;

arranging the second electrolyte in contact with the second side of the separator;

arranging the second electrode in contact with the second electrolyte; and arranging the packaging component to package the first electrode, the second electrode, the first electrolyte, the second electrolyte, and the separator to form the energy storage device, wherein the energy storage device is configured to provide pseudocapacitance based at least in part on a surface layer deposition of a chemical entity in the first electrolyte accompanied by a charge transfer at the first electrode and wherein the first electrolyte comprises a first solution comprising a first species and the second electrolyte comprises a second solution comprising a second species, wherein the first solution and the second solution are substantially separate and wherein the first species is different from the second species.

13. The method of claim 12, wherein the chemical entity comprises a noble metal.

14. The method of claim 13, wherein the noble metal comprises palladium.

15. The method of claim 14, wherein the second electrode comprises platinum.

16. The method of claim 15, wherein the first electrolyte comprises a solution of sodium tetrachloropalladate(II) ($Na_2PdCl_4$) in ethanol.

17. The method of claim 16, wherein the first electrolyte further comprises lithium perchlorate ($LiClO_4$).

18. The method of claim 12, wherein the separator comprises at least one of a paper material or an ion permeable polymer membrane material.

19. The method of claim 12, wherein the graphene comprises at least one of a graphene paper, a graphene sheet, a packed graphene, an aggregate of extended graphene, a modified graphene, or a pure graphene.

20. A method for providing pseudocapacitance comprising:

contacting a first electrolyte and a first electrode including graphene;

contacting a second electrolyte and a second electrode, wherein the first electrode comprises at least one material that is different from any materials of the second electrode;

separating the first electrolyte and the second electrolyte with a separator having a first side and a second side, wherein the first electrolyte is arranged in contact with the first side of the separator and a second electrolyte is arranged in contact with the second side of the separator, wherein the first electrolyte is arranged in contact with the first electrode and the second electrolyte is arranged in contact with the second electrode, and wherein the first electrolyte comprises a first solution comprising a first species and the second electrolyte comprises a second solution comprising a second species, wherein the first solution and the second solution are substantially separate and wherein the first species is different from the second species; and providing a surface layer deposition of a chemical entity at the first electrode, wherein the surface layer deposition is accompanied by a charge transfer at the first electrode that provides pseudocapacitance between the first electrode and the second electrode.

21. The method of claim 20, wherein the graphene comprises at least one of a graphene paper, a graphene sheet, a packed graphene, an aggregate of extended graphene, a modified graphene, or a pure graphene.

22. The method of claim 20, wherein the surface layer deposition comprises an electrodeposition.

23. The method of claim 22, wherein the electrodeposition produces at least one of monolayer coverage or fractional monolayer coverage of the chemical entity.

24. The method of claim 20, wherein the chemical entity includes a noble metal.

25. The method of claim 24, wherein the noble metal comprises palladium.

26. The method of claim 25, wherein the first electrolyte comprises a solution of sodium tetrachloropalladate(II) ($Na_2PdCl_4$) in ethanol.

27. The method of claim 26, wherein the first electrolyte further comprises lithium perchlorate ($LiClO_4$).

28. The method of claim 27, wherein the first electrode comprises graphene and the second electrode comprises platinum.

29. A machine readable non-transitory medium having stored therein a plurality of instructions that, when executed, cause the machine to produce an energy storage device having capacitive-like properties by:

receiving a first electrode including graphene, a second electrode, a first electrolyte, a second electrolyte, a separator having a first side and a second side, and a packaging component, wherein the first electrolyte comprises a first solution comprising first species and the second electrolyte comprises a second solution comprising second species and wherein the first species are different from the second species;

arranging the first electrode in contact with the first electrolyte;

arranging the first electrolyte in contact with the first side of the separator;

arranging the second electrolyte in contact with the second side of the separator;

arranging the second electrode in contact with the second electrolyte; and arranging the packaging component to package the first electrode, the second electrode, the first electrolyte, the second electrolyte, and the separator to form the energy storage device, wherein the energy storage device is configured to provide pseudocapacitance based at least in part on a surface layer deposition of a chemical entity in the first electrolyte accompanied by a charge transfer at the first electrode.

30. An apparatus comprising:

a machine readable medium having stored therein a plurality of instructions that, when executed, cause the apparatus to produce an energy storage device having capacitive-like properties by:

receiving a first electrode including graphene, a second electrode including platinum, wherein the second electrode does not include graphene, a first electrolyte, a second electrolyte, a separator having a first side and a second side, and a packaging component;

arranging the first electrode in contact with the first electrolyte;

arranging the first electrolyte in contact with the first side of the separator;

arranging the second electrolyte in contact with the second side of the separator;

arranging the second electrode in contact with the second electrolyte; and arranging the packaging component to package the first electrode, the second electrode, the first electrolyte, the second electrolyte, and the separator to form the energy storage device, wherein the first electrolyte includes a first constituent that is different from a second constituent of the second electrolyte wherein the energy storage device is configured to provide pseudocapacitance based at least in part on a surface layer deposition of a chemical entity in the first electrolyte accompanied by a charge transfer at the first electrode and wherein a packing density of the graphene is configured to provide an energy density per unit volume of about $1.83 \times 10^{-2}$ Wh/cm$^3$ and a specific energy density per unit mass of about $4.70 \times 10^2$ Wh/kg; and a processor coupled to the machine readable medium to execute the plurality of instructions.

31. A machine readable non-transitory medium having stored therein a plurality of instructions that, when executed, cause the machine to provide pseudocapacitance by:

contacting first electrolyte and a first electrode including graphene;

contacting a second electrode and second electrolyte, wherein the second electrode does not include graphene and the electrolyte wherein the first electrolyte and the second electrolyte are separated by an ion-permeable barrier and wherein the first electrolyte comprises a first solution comprising first constituents and the second electrolyte comprises a second solution comprising second constituents wherein the first constituents are different from the second constituents; and providing a surface layer deposition of a chemical entity at the first electrode, wherein the surface layer deposition is accompanied by a charge transfer at the first electrode that provides pseudocapacitance between the first electrode and the second electrode.

32. An apparatus comprising:

a machine readable medium having stored therein a plurality of instructions that, when executed, cause the apparatus to provide pseudocapacitance by:

contacting a first electrolyte comprising a first gel and a first electrode including graphene;

contacting a second electrode and a second electrolyte comprising a second gel, wherein first species of a first composition of the first gel is different from second species of a second composition of the second gel; and providing a surface layer deposition of a chemical entity at the first electrode, wherein the surface layer deposition is accompanied by a charge transfer at the first electrode that provides pseudocapacitance between the first electrode and the second electrode; and a processor coupled to the machine readable medium to execute the plurality of instructions.

* * * * *

UNITED STATES PATENT AND TRADEMARK OFFICE
CERTIFICATE OF CORRECTION

| | |
|---|---|
| PATENT NO. | : 8,842,416 B2 |
| APPLICATION NO. | : 13/202082 |
| DATED | : September 23, 2014 |
| INVENTOR(S) | : Chen et al. |

It is certified that error appears in the above-identified patent and that said Letters Patent is hereby corrected as shown below:

In the Drawings

In Fig. 6, Sheet 5 of 5, delete "uP/uC/ DSP" and insert -- $\mu P/\mu C/$ DSP --, therefor.
(See Attached Sheet)

In Fig. 6, Sheet 5 of 5, for Tag "(615)", in Line 1, delete "Controler" and insert -- Controller --, therefor.

In the Specification

In Column 1, Line 1, delete "371" and insert -- 35 U.S.C. §371 --, therefor.

In Column 2, Line 13, delete "ann" and insert -- an --, therefor.

In Column 6, Line 8, delete "the may" and insert -- they may --, therefor.

In Column 11, Line 58, delete "bout" and insert -- about --, therefor.

In Column 13, Line 35, delete "(15)" and insert -- (16) --, therefor.

Signed and Sealed this
Seventeenth Day of March, 2015

Michelle K. Lee
*Director of the United States Patent and Trademark Office*

Fig. 6